Sept. 30, 1958 L. C. HARLOW 2,853,737
AUTOMATIC MOLDING APPARATUS
Filed June 29, 1954 3 Sheets-Sheet 1

INVENTOR.
Loraine C. Harlow
BY Morris L. Rabin
ATTORNEY

Sept. 30, 1958 — L. C. HARLOW — 2,853,737
AUTOMATIC MOLDING APPARATUS
Filed June 29, 1954 — 3 Sheets-Sheet 2

INVENTOR.
Loraine C. Harlow
BY
ATTORNEY

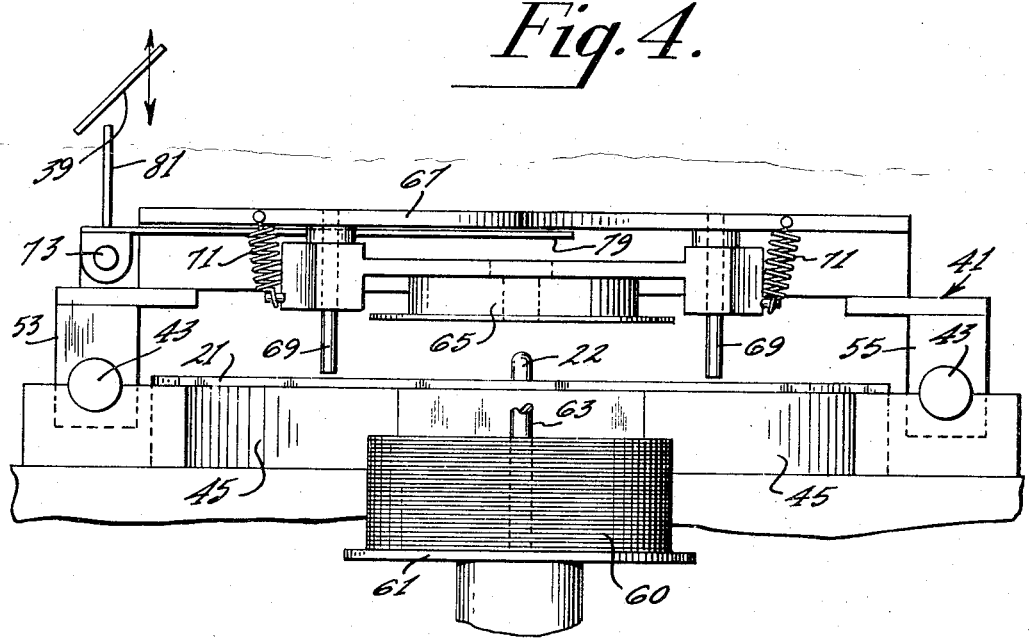
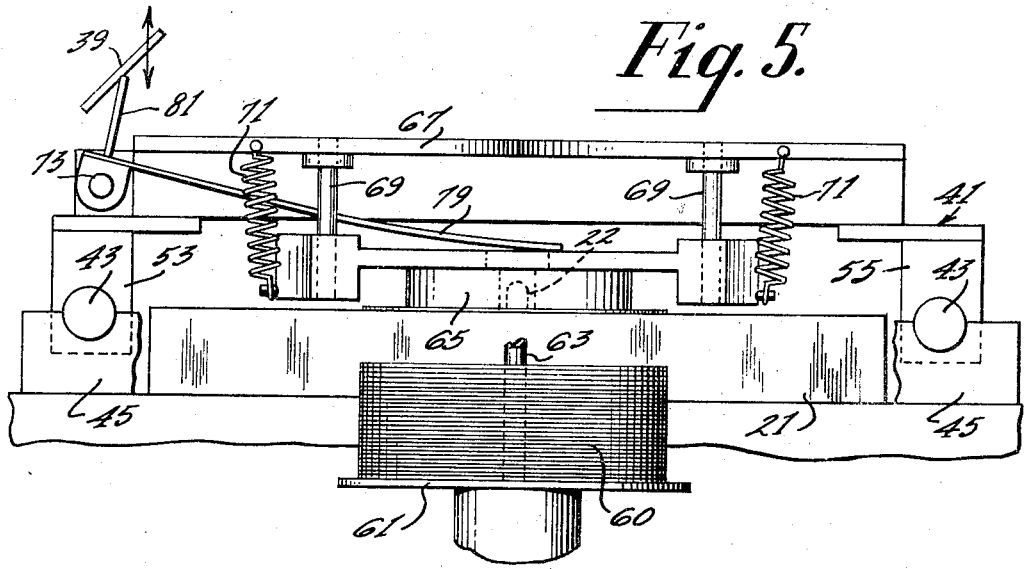

United States Patent Office 2,853,737
Patented Sept. 30, 1958

2,853,737

AUTOMATIC MOLDING APPARATUS

Loraine C. Harlow, Greenfield, Ind., assignor to Radio Corporation of America, a corporation of Delaware Application June 29, 1954, Serial No. 439,963

6 Claims. (Cl. 18—5.3)

This invention relates to improved molding apparatus, and, more particularly, to apparatus for accomplishing automatically several of the manufacturing steps which have previously been carried out manually in connection with molding certain types of articles from synthetic resin compositions.

In United States Patent No. 2,743,478, issued to L. C. Harlow and Q. E. Smith and entitled "Automatic Molding Apparatus," there is disclosed a completely automatic apparatus for the manufacture of molded articles. This apparatus includes means for depositing labels on each of the molding platens of a conventional compression molding press, means for placing a charge of moldable material between the platens, means for removing the molded article from between the platens to a remote position, and means at one or more positions for performing certain finishing or trimming operations. In this apparatus, the means for removing the molded article from the molding platens and the means for placing the labels on the platens are independent parts of the apparatus. The means for placing labels on the lower molding platen comprises a separate and expensive cam which, through a system of racks and gears, pivots an arm and suction cup in and out of the press opening.

In apparatus embodying the present invention, a new and improved lower label loader makes use of the article remover carriage, which is already a part of the above mentioned apparatus, to carry a pneumatic label carrying device and associated mechanism for depositing labels on the lower molding platen. This carriage, as described in the copending application, carries a pair of jaws which are adapted to grip and suspend the molded article as the molding platens open at the completion of the molding cycle. The carriage then carries the molded article to a punching station where a trimming operation is performed upon it. According to the present invention, the carriage is extended and has a label pick-up cup and associated mechanism mounted on it. During the molding cycle, when the jaws are in position to receive the molded article, the suction cup is in a position over a label stack. This stack is raised toward the pick-up cup, and the top label is held by the cup. When the molding cycle is completed and in response to the opening of the platens, the carriage carries the molded article to a trimming station and carries the label to a position over the lower platen. In response to the trimming operation performed on the molded article, the label is caused to be deposited onto the lower platen.

The principal object of this invention, therefore, is to provide an improved apparatus for automatically removing a molded article from between the platens of a molding press, for picking up a label to be placed on one of the platens of the press, for carrying the molded article to a position remote from the platens and for carrying the label to a position over one of the platens, and for placing the label on one of the platens.

The novel features of the invention, as well as additional objects and advantages thereof, will be understood more fully from the following description when read in connection with the accompanying drawings, in which:

Figure 4 is a diagrammatic end elevational view of a portion of the molding apparatus of Figure 1 showing the carriage in position for carrying a label between the label stack and the lower molding platen; and Figure 5 is a view similar to Figure 4 and showing the carriage mechanism depositing a label on the platen.

Figure 1:
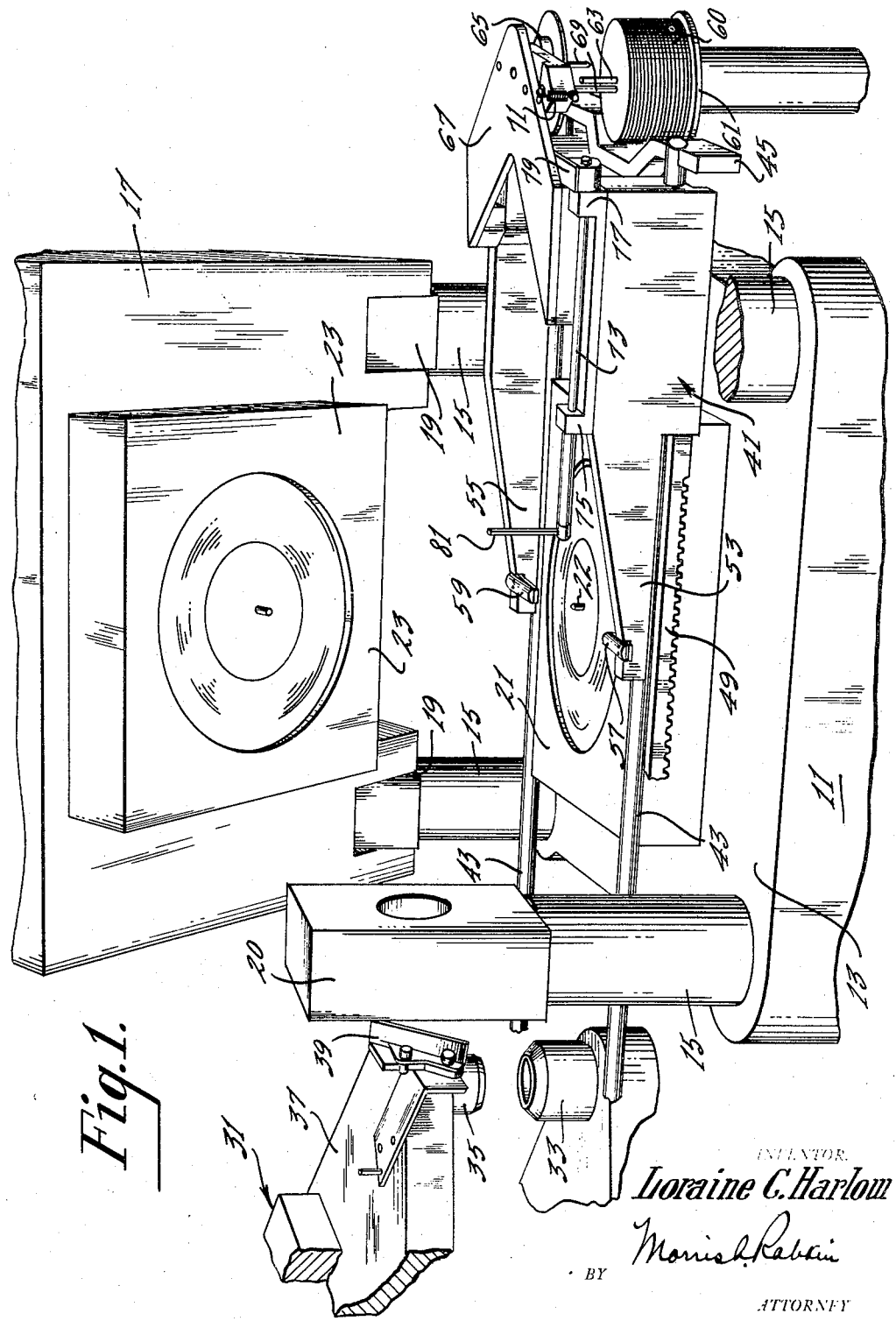
Figure 1 is a perspective view of a portion of a molding apparatus according to the present invention showing a pair of molding platens in the open position; a carriage in position for gripping the molded article; and a suction cup in position for receiving a label from the label stack.

Referring in detail to the accompanying drawings, wherein similar reference characters designate similar parts throughout, all of the figures illustrate a portion of a molding apparatus similar to that described in the above mentioned copending application. Referring primarily to Figure 1, the apparatus here shown includes a molding press 11 having a lower platen 13 which remains in a substantially horizontal position at all times. The lower platen is mounted for sliding movement on four cylindrical guide posts 15 vertically mounted on the press bed which is not shown. An upper platen 17 is mounted to pivot on hinges 19 comprising the upper portions of the two guide posts 15 located at the rear of the press. The rectangular metal blocks 20 (one of which appears in Figure 1) which comprise the upper portions of the guide posts located at the forward portion of the press, are a part of the locking means for the upper platen 17 when it is in the closed position. Lower and upper molds 21 and 23 are mounted respectively on the lower and upper platens 13 and 17.

A portion of a punch press 31 is shown at one side of the molding press. This punch press includes a pair of dies which may be used to perform a trimming operation on the molded article. The lower die 33 is stationary while the upper die 35 is mounted on a press head 37 which is movable in a vertical direction. Also mounted on the press head 37 is a cam 39 the function of which will be described later.

An article remover carriage 41 is mounted over the lower platen for reciprocating movement in a horizontal direction. This carriage is supported on a pair of tubular tracks 43 which are rigidly attached to the press bed by means of supporting brackets 45 and 47 for example. These tracks 43 are disposed in parallel relation along either side of the lower press mold 21. The apparatus for moving the carriage back and forth along the tubular tracks comprises a rack 49 connected to the under side of the carriage, and a large diameter pinion gear 51 (Figure 3) in mesh with this rack. Means for rotating this gear in opposite directions in accordance with a predetermined time cycle have been described in the copending application and need not be described here as a description of its operation is not necessary to an understanding of the present invention.

Figure 2:
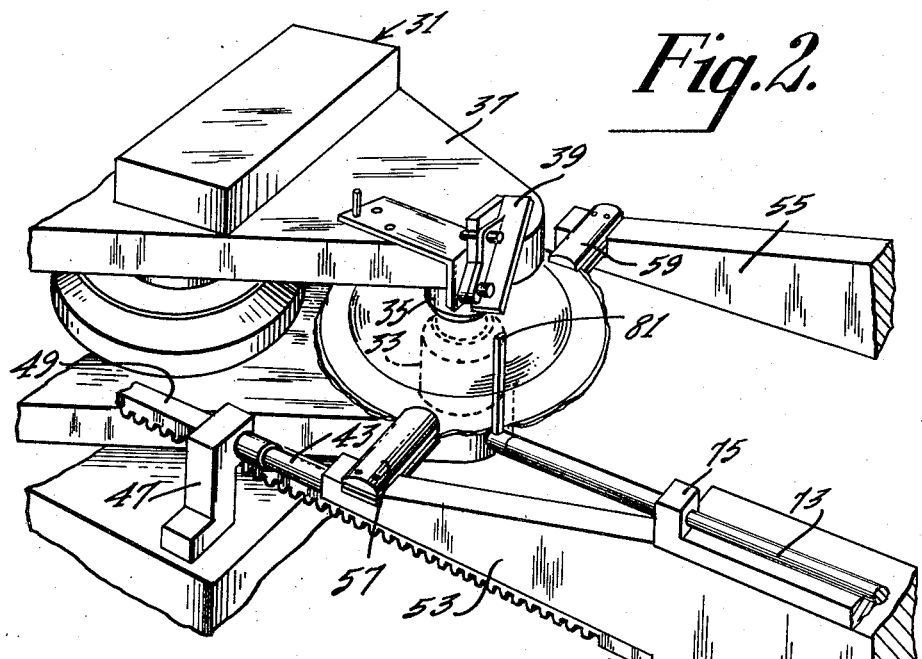
Figure 2 is a fragmentary perspective view of the molding apparatus of Figure 1 showing the jaw portion of the carriage holding the molded article at the finishing station.

The article remover carriage is provided with two arms 53 and 55 disposed in parallel relationship and extending outwardly above the tracks 43 respectively. When the molding platens are closed, these arms are outside the molds. Near the outward end of each of the arms 53 and 55 is mounted a pair of jaws 57 and 59. These pairs of jaws extend transversely with respect to the arms and also extend toward each other so that they may be in position to grip the edge of a molded article when the platens are opened and the molds are separated. The molded article may be gripped, for example, by means of a flashing which flows out between the molds 21 and 23 of the press when the platens are closed and engaged in a molding operation. For the purpose of clarity, no molded article is shown being held by the jaws of Figure 1. In Figure 2 the jaws are shown holding a molded article such as a phonograph record, for example.

At the side of the molding press opposite from the punch press 31 is mounted means for supporting a stack of labels 60 comprising a label stack platform 61 and a label spindle 63. Mounted on the article remover carriage 41 is a means for holding the top label from the label stack such as a pneumatic pick-up cup 65. A bracket 67, which is secured to the end of the article remover carriage opposite from that of the arms 53 and 55, supports a pair of downwardly extending guide pins 69. The pick-up cup 65 is mounted to slide in a vertical direction on these guide pins 69. The pick-up cup is normally held in its uppermost position, against the bracket 67, by a pair of springs 71.

A shaft 73 is mounted on one side of the article remover carriage 41 and is disposed in a direction substantially parallel to the tubular track 43. This shaft is supported by bearings 75 and 77. At one end of the shaft, adjacent the label pick-up cup, is attached a transverse arm 79 which extends in a substantially horizontal direction and engages the top of the pick-up cup beneath the bracket 67. When this shaft 73 is rotated in one direction, the arm 79 will cause the cup 65 to move downwardly away from the bracket 67 on the guide pins 69.

Figure 3:
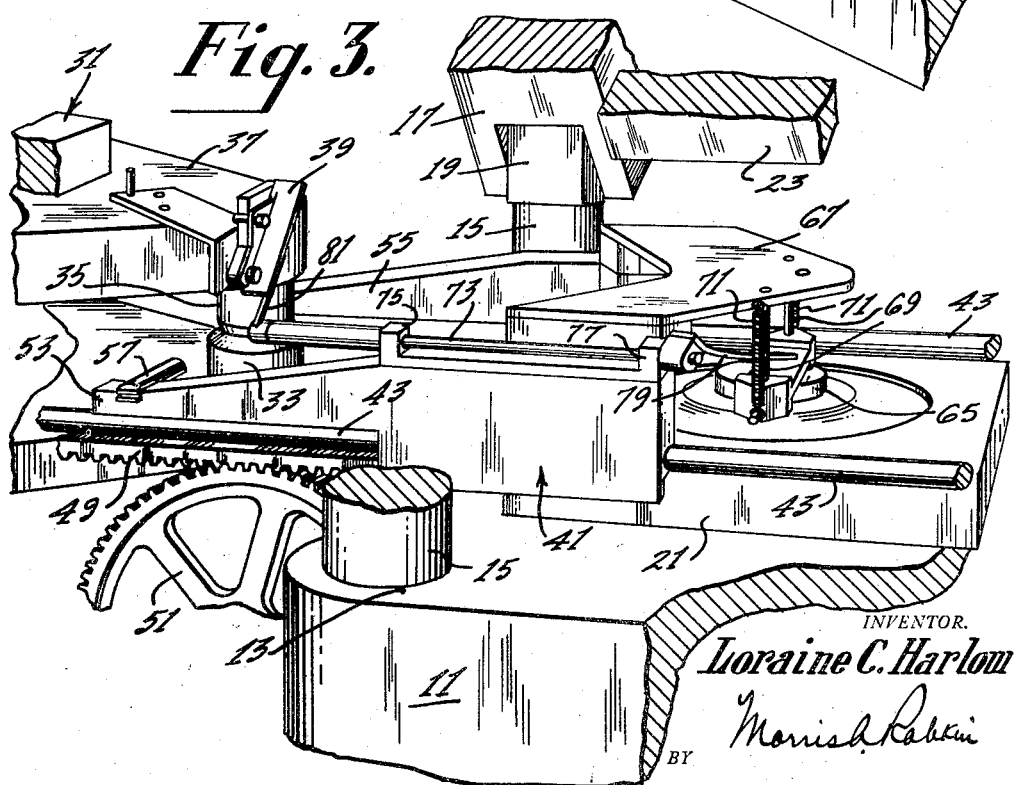
Figure 3 is a perspective view of a portion of the molding apparatus of Figure 1 showing the carriage mechanism depositing a label on the lower platen.

At the other end of the shaft 73 is attached a transverse, vertically extending arm 81. When the article remover carriage 41 is moved to a position where a trimming operation may be performed on the molded article by the punch press 31, the vertical arm 81 is in a position beneath the cam 39 which is mounted on the punch press head 37. This condition is illustrated in Figure 2. In this position of the article remover carriage the pick-up cup is positioned over the center of the lower mold 21. When the upper die of the punch press descends to perform the trimming operation on the molding article, a cam 39 engages the vertical arm 81 causing the shaft 73 to rotate. This rotation causes the pick-up cup 65 to move downward on guide pins 69 to engage the lower mold 21 and deposit a label thereon. This condition is illustrated in Figure 3.

A brief description of the operating sequence will now be given. Figure 1 illustrates the molding apparatus as it would appear after the completion of a molding cycle when the molding platens have just opened. The article remover carriage is in position to grip the molded article as the platens are opened. However, for the purpose of clarity, no article is shown being gripped by the jaws in this figure. During the molding cycle, the label stack platform 61 is raised upwardly to press the top label on the stack against the pick-up cup 65. At this time a vacuum has been applied to the pick-up cup so that the top label will be held to the pick-up cup when the platform 61 is lowered.

In response to the opening of the platens a main drive motor (not shown) for the apparatus is started which drives the pinion gear 51 causing the article remover carriage to be moved to the left by means of rack 49. This movement will be stopped when the jaws 57 and 59 are in position on opposite sides of the punch press dies 33 and 35. In this position the pick-up cup 65 will be directly over the lower mold 21.

Figure 2 shows the jaws and a portion of the arms of the article remover carriage in this position and shows a molded article, such as a phonograph record, held by the jaws 57 and 59 in readiness for a punching operation. The vertical arm 81 of the carriage shaft 73 is in a position directly beneath the cam 39 which is mounted on the punch press 31. This condition of the apparatus is also illustrated, diagrammatically, in Figure 4. When the upper die 35 of the punch press comes down to perform the trimming operation, the cam 39 engages the vertical arm 81 causing rotation of the shaft 73 and the arm 79. The arm 79 urges the pick-up cup 65 downward on the guide pins 69 until a label which is held by the pick-up cup is slipped over a pin 22 on the lower mold 21. This phase of the operation is illustrated in Figure 3 and is further illustrated, diagrammatically, in Figure 5.

When the upper die 35 reaches its lowermost position, it strikes a microswitch (not shown) which shuts off the vacuum applied to the pick-up cup 65. When the upper die then returns to its normal position, the pick-up cup is drawn away from the lower mold 21 by the springs 71 and the label is retained on the mold 21 by means of frictional engagement with the mold pin 22.

At the completion of this operation, the carriage may again move away from the platens either for a subsequent trimming operation or for depositing the finished article at a remote point and will then return to its original position, illustrated in Figure 1, and the cycle will be repeated.

What is claimed is:

1. Molding apparatus comprising an upper and a lower platen, said upper platen having an open and closed position, a carriage adapted to travel across said lower platen when said upper platen is opened, said carriage having arms supporting gripping means disposed in opposed positions with respect to said platens when said upper platen is closed, said gripping means being adapted to engage two sides of a molded article when said upper platen is opened, a pneumatic pick-up device mounted on said carriage, said pick-up device being adapted to pick up a label from a stack of labels when said upper platen is closed, and said carriage being movable to deposit said molded article at a station adjacent said platens and to deposit a label on said lower platen.

2. Molding apparatus comprising an upper and a lower molding platen, said platens having an open and closed position, means for holding a stack of labels, a carriage mounted for movement across said lower platen when said platens are in the open position, said carriage having arms each supporting a pair of jaws for gripping a molded article at opposite sides thereof when said platens are opened, said jaws being disposed in opposed positions with respect to said platens when said platens are in the closed position, a pneumatic pick-up device mounted on said carriage and positioned over said label holding means when said platens are in the closed position, said carriage being movable across said lower platen when said platens are opened to position said molded article at a station adjacent said platens and to position said pick-up device over said lower platen, and means for engaging said pick-up device with said lower platen to deposit a label thereon.

3. In a molding apparatus including an upper and a lower molding platen, means for opening and closing said platens, a punching station including an upper and a lower die and means for moving one of said dies relative to the other of said dies; the combination comprising apparatus for carrying a molded article from between said molding platens to said punching station, apparatus for placing a label on said lower platen, said article carrying apparatus comprising a carriage having two pairs of jaws for gripping said molded article when said platens are opened, said label placing apparatus comprising a pneumatic pick-up device mounted on said carriage, means for holding a stack of labels, means for causing said device to pick up a label from said stack when said platens are in the closed position, means responsive to the opening of said platens for causing said carriage to transfer said article to said punching station, and means responsive to the operation of said movable die for causing said pick-up device to deposit said label on said lower platen.

4. A phonograph record molding apparatus comprising a set of molding platens having an open and a closed position, one of said platens remaining in a substantially horizontal position, means for holding a stack of labels, means for gripping said molded record and suspending said molded record out of contact with said platens when said platens are in the open position, a pneumatic pick-up device for picking up a label from a stack of labels on said label holding means, a movable carriage having mounted thereon said record gripping means and said pneumatic pick-up device, means responsive to the opening of said platens for moving said carriage across said horizontally disposed platen and positioning said carriage whereby said molded record is positioned adjacent said molding platens and whereby said label is positioned over said horizontally disposed platen, and means associated with said carriage and responsive to said positioning of said carriage for depositing said label onto said horizontally disposed platen.

5. In apparatus for molding phonograph records including a set of molding platens having an open and a closed position, a punching station for performing a trimming operation on said phonograph records and means supporting a stack of labels, said molding platens being adapted to exert a molding pressure on a charge of moldable material positioned between said platens such that a part of said charge exudes from between said platens to form a flashing upon closure of said platens; the combination comprising a carriage mounted for movement across one of said platens when said molding platens are in the open position, means associated with said carriage for gripping said flashing at oppositely disposed points when said platens are opened, suction means associated with said carriage for obtaining a label from said label stack when said platens are in the closed position, means responsive to the opening of said platens for moving said carriage whereby said molded article is positioned at said punching station and whereby said suction means is positioned over one of said platens, and means responsive to said trimming operation for causing said suction means to deposit said label on said one platen.

6. In apparatus for molding phonograph records including a set of molding platens having an open and a closed position, one of said platens remaining in a substantially horizontal position, said molding platens being adapted to exert a molding pressure on a charge of moldable material positioned between said platens such that a part of said charge exudes from between said platens to form a flashing upon closure of said platens, a punching station for performing a trimming operation on said molded record, said punching station comprising at least one movable die, and means for holding a stack of labels; the combination comprising two pairs of jaws disposed in diametrically opposed positions with respect to said platens when said platens are in said closed position for gripping said flashing and suspending said molded record out of contact with said platens when said platens are in the open position, a pneumatic pick-up device for picking up a label from a stack of labels on said label holding means when said molding platens are in said closed position, said pairs of jaws and said pneumatic pick-up device being mounted on a movable carriage, means responsive to the opening of said platens for moving said carriage across said horizontally disposed platen to a position where said jaws position said molded record at said punching station and said pneumatic pick-up device positions said label over said horizontally disposed platen, and means responsive to the operation of said movable punching die for depositing said label on said horizontally disposed platen.

References Cited in the file of this patent

UNITED STATES PATENTS

| | | |
|---|---|---|
| 1,473,649 | Schlesinger | Nov. 13, 1923 |
| 1,706,874 | De Journo | Mar. 26, 1929 |
| 2,275,561 | Sahlin | Mar. 10, 1942 |
| 2,454,556 | Hirst | Nov. 23, 1948 |
| 2,578,329 | Von Hofe | Dec. 11, 1951 |
| 2,651,429 | Von Hofe | Sept. 8, 1953 |